(12) United States Patent
Roebke et al.

(10) Patent No.: US 8,129,908 B2
(45) Date of Patent: Mar. 6, 2012

(54) NAVIGATION LIGHT DEVICE FOR AN AIRCRAFT, IN PARTICULAR A MILITARY AIRPLANE

(75) Inventors: Steffen Roebke, Paderborn (DE);
Andreas Huentelmann, Erwitte (DE);
Robert Trinscheck, Hamm (DE)

(73) Assignee: Goodrich Lighting Systems GmbH, Lippstadt (DE)

( * ) Notice: Subject to any disclaimer, the term of this patent is extended or adjusted under 35 U.S.C. 154(b) by 401 days.

(21) Appl. No.: 12/543,369

(22) Filed: Aug. 18, 2009

(65) Prior Publication Data

US 2010/0096989 A1 Apr. 22, 2010

Related U.S. Application Data

(60) Provisional application No. 61/090,932, filed on Aug. 22, 2008.

(30) Foreign Application Priority Data

Aug. 22, 2008 (EP) .................................... 08162852

(51) Int. Cl.
*B64D 47/02* (2006.01)
*B64D 47/06* (2006.01)
*B60Q 1/14* (2006.01)
(52) U.S. Cl. ........... 315/77; 315/360; 362/470; 340/981
(58) Field of Classification Search .................... 315/77, 315/76, 82, 360; 362/470; 340/981, 982
See application file for complete search history.

(56) References Cited

U.S. PATENT DOCUMENTS

| | | | | |
|---|---|---|---|---|
| 3,873,962 A | * | 3/1975 | Eggers et al. | 340/981 |
| 6,011,493 A | * | 1/2000 | Bushell et al. | 340/981 |
| 6,268,702 B1 | * | 7/2001 | Fleck | 315/185 R |
| 6,559,777 B1 | * | 5/2003 | Martin et al. | 340/981 |
| 2005/0128759 A1 | * | 6/2005 | Fredericks et al. | 362/470 |
| 2011/0122635 A1 | * | 5/2011 | Calvin et al. | 362/470 |

FOREIGN PATENT DOCUMENTS

| | | |
|---|---|---|
| EP | 0736453 A2 | 10/1996 |
| EP | 1336943 A1 | 8/2003 |
| JP | 2001-138804 A | 5/2001 |

* cited by examiner

*Primary Examiner* — Don Le
(74) *Attorney, Agent, or Firm* — Jerry J. Holden; John D. Titus

(57) ABSTRACT

The navigation lighting device for an aircraft, in particular a military aircraft and preferably a fighter aircraft is provided with several navigation light units with navigation lights, a power supply unit for the navigation tight units, and a central actuation unit for the actuation of the navigation light units in each one of several modes of operation. The navigation light units can be actuated for operation in a mode of operation by the central actuation unit sequentially in a predetermined sequence and thus with a time offset. Each navigation light unit comprises a control unit connected to the actuation unit for the actuation of its navigation light in the operation mode predetermined by the central actuation unit. The control units of the navigation light units comprise time-delay elements for the temporal delay of the actuation of the navigation lights on the receipt of an actuation signal of the central actuation unit.

16 Claims, 2 Drawing Sheets

NAVIGATION LIGHT DEVICE FOR AN AIRCRAFT, IN PARTICULAR A MILITARY AIRPLANE

CROSS-REFERENCE TO RELATED APPLICATIONS

This application claims priority to European application having application number EP 08 162 852.1, filed Aug. 22, 2008, and to U.S. provisional application having application No. 61/090,932, filed Aug. 22, 2008, which are incorporated herein by reference.

BACKGROUND OF THE INVENTION

The invention relates to a navigation lighting device for an aircraft which is, in particular, a military aircraft and preferably a fighter aircraft.

Aircraft have navigation lighting which serves for better recognition of an aircraft by other aircraft. While in the case of civilian aircraft the navigation lighting works essentially in a single operational mode, the navigation lighting of military aircraft can be operated in several modes (for example, friend/foe recognition).

In the case of military aircraft, in order to be able to operate the navigation lighting in one of the possible modes of operation, one needs along with the power supply, as a general rule, additional control lines, which is associated with additional complexity in wiring. This is, in particular, disadvantageous when existing aircraft are to be equipped with a modern navigation lighting system. Furthermore, it must be noted that the actuation of the navigation lighting is not sensitive to electromagnetic interference and itself does not also cause electromagnetic interference.

From EP-A-1 336 943 it is a known practice to realize the actuation of a warning light device of an aircraft via the power supply bus and in coded form.

SUMMARY

It is the objective of the invention to provide a navigation lighting device for an aircraft, in particular a military aircraft and preferably a fighter aircraft, where the navigation lighting device is, to the greatest extent possible, not sensitive to electromagnetic interference.

For the realization of this objective we propose with the invention a navigation lighting device for an aircraft, in particular a fighter aircraft, where the navigation lighting device is provided with
  several navigation light units with navigation lights,
  a power supply unit for the navigation light units, and
  a central actuation unit for the actuation of the navigation light units in each one of several modes of operation.
In this navigation lighting device it is provided according to the invention
  that the navigation light units for operation in a mode of operation can be actuated by the actuation unit sequentially in a predetermined sequence and thus with a time offset,
  that each navigation light unit comprises a control unit connected to the actuation unit for the actuation of its navigation light in the mode of operation predetermined by the central actuation unit,
  that the control units of the navigation light units comprise time-delay elements for the temporal delay of the actuation of the navigation lights on the receipt of an actuation signal of the central actuation unit, and
  that the time-delay elements of the control units of the navigation light units are set in such a manner that the navigation lights of all the navigation light units can be actuated by their control units despite a temporally offset receipt of the actuation signals of the central actuation unit.

The navigation lighting device according to the invention comprises several navigation light units with navigation lights which, for example, are disposed outside on the aircraft according to the legal specifications or the military requirements. The navigation light units are supplied by a power supply unit with the power required for their operation. Via a central control unit, which, for example, can be operated from the cockpit, the navigation light units are actuated in each one of several modes of operation.

Each navigation light unit of the navigation lighting device according to the invention is provided with a control unit for the actuation of its navigation light, and in fact according to the mode of operation as predetermined via the central actuation unit. According to the invention the navigation light units, for operation in a mode of operation, are actuated by the actuation unit with a temporal offset, and in fact sequentially in a predetermined sequence and thus with a time offset. The temporal difference between each two sequentially actuated navigation light units is thus known and equal or unequal and in particular in each case essentially equal. The control units of the navigation light units are provided with time-delay elements for the temporal delay of the actuation of the navigation lights on the receipt of an actuation signal from the central actuation unit. The time-delay elements can be implemented in software and/or hardware. The control units as well as the central actuation unit also comprise software along with hardware components. According to the invention the time-delay elements of the control units of the individual navigation light units are coordinated with one another in such a manner that the navigation light of a navigation light unit is actuated (at the earliest) when the last of the sequentially actuated navigation light units has received its actuation signal from the central actuation unit. In other words, the time delay of the time-delay element of the navigation light unit actuated first is therefore the longest while the time delay element of the navigation light unit actuated last during an actuation sequence has the time delay that is set to be the shortest, which in particular can be zero but does not have to be.

Through the temporal offset of the actuation of all the navigation light units the electromagnetic compatibility of the navigation lighting device is improved so that for the adherence to the legal or militarily desired EMC requirements a lesser effort has to be expended. In particular, this applies for aircraft in which, in the absence of a control line, the actuation of the navigation light units by the central actuation unit must take place via the power supply lines and, in given cases in particular, via the housing or the outer shell of the aircraft, if this or these are used as a common frame potential, which can be the case in particular in the case of older (fighter) aircraft. Thus, even these older aircraft can be modernized with respect to their navigation lighting with little effort.

Depending on the type of aircraft the navigation light units can be subdivided into several groups, each of at least two navigation light units. In a (fighter) aircraft formed as a swing-wing aircraft there are, for example, two navigation lights at the ends of the wings, two navigation lights in the area of the engine intakes, and two navigation lights on the elevator unit or rudder unit. In a constellation of this type there are then three groups of two navigation light units, each with two navigation lights and corresponding control units, where the three groups are actuated sequentially. Within the navigation lights of a group of navigation light units there is no temporal offset between themselves during actuation.

The time difference between the time delays set with the delay elements of the control units of each two navigation light units is equal to the time offset between the times of the actuation unit's actuation of the control units of the two navigation light units in question. Here therefore the actuation signal for the navigation light unit actuated last during a sequence can then be switched through by its control unit preferably directly and without the optional time delay for actuation of the navigation light.

In an advantageous extension of the invention it is furthermore provided that the actuation signals of the central actuation unit include binary data for coding, where said binary data can be generated by short-term interruption of the power supply line of a navigation light unit, where the duration of the interruption specifies the binary status, and where the navigation light units comprise energy storage devices for supplying their navigation lights during the interruption of the power supply.

In order not to have to store the different actuation of the navigation lights according to the mode of operation chosen for each of them decentrally in each navigation light unit, as well as for reasons of increased security against interference, it is expedient if the central actuation unit repeatedly sequentially actuates the navigation lighting units during one and the same mode of operation and during the entire period of operation of the navigation lighting device. This applies in particular when the navigation lights are to shine in the manner of a flashing light with a predetermined pattern of flashing light. Furthermore, this process has the advantage that when a navigation light unit or its control unit does not immediately recognize the code for a mode of operation, this code is transmitted by the actuation unit temporally sequentially again and again (for all the navigation light units). Only when the control unit of a navigation light unit does not recognize, for a predetermined period of time (maximum period of time), a valid code in the actuation signals of the actuation unit does the navigation light unit in question work, preferably in the operation mode corresponding to the code last recognized.

Along with the navigation lighting device the invention furthermore also relates to an aircraft, in particular a fighter aircraft, with a metallic housing and a navigation lighting device according to one of the foregoing embodiment examples, where the navigation light units are disposed on the housing.

BRIEF DESCRIPTION OF THE DRAWING

The invention will be explained in more detail in the following with the aid of an embodiment example and with reference to the drawings. In detail, in connection with this

DETAILED DESCRIPTION

The invention will be described in the following with the aid of the navigation lighting of a swing-wing aircraft. At this point, however, let it be expressly emphasized that the invention is not restricted to application in navigation lighting for swing-wing aircraft. The invention can be used in any case where more than two navigation lights are present in one aircraft. In a navigation lighting system of this type the several navigation lights can be actuated sequentially at predetermined intervals of time, where one nonetheless obtains the result that the activation of the navigation lights takes place simultaneously despite temporally offset, sequential actuation.

Figure 1:
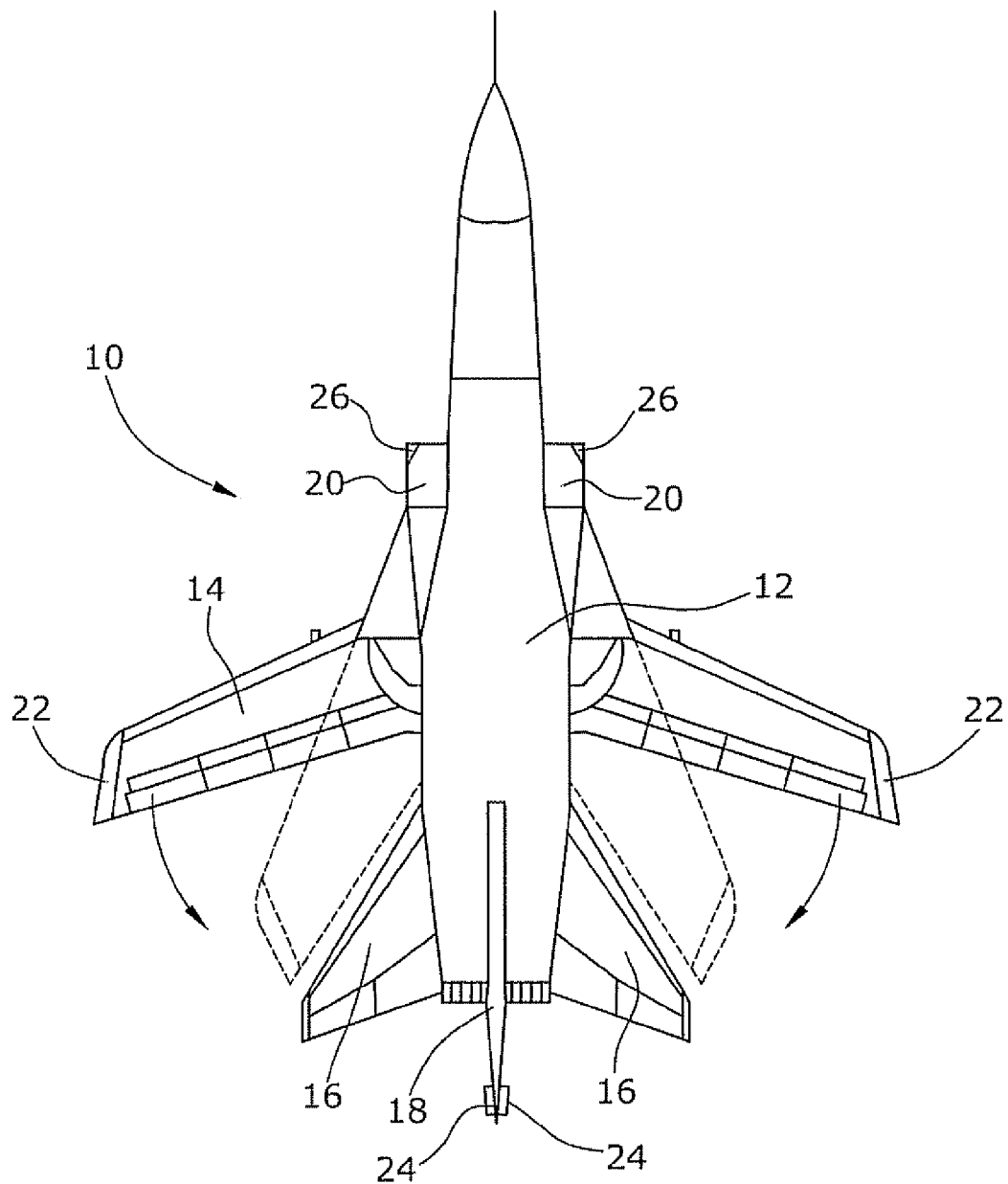
FIG. 1 shows schematically a swing-wing fighter aircraft in top view to clarify the arrangement of the navigation lighting in this type of aircraft and FIG. 2 shows schematically the main components of the system for controlling the navigation lighting of the aircraft according to FIG. 1 in each of several possible modes of operation.

FIG. 1 shows, in top view and formed as a swing-wing aircraft, a fighter aircraft 10 whose outer shell is formed by, among other things, the fuselage 12, the wings 14, and the elevator unit and rudder unit 16, 18. On the fuselage 12 two engines are disposed, whose intakes are represented by 20.

This aircraft 10 comprises, in all, six navigation lights, where two navigation light units 22 are disposed at the ends of the wings 14, two navigation light units 24 are disposed on the rudder unit 18, and two navigation light units 26 are disposed at the intakes 20 of the engines. Along with this, the navigation light units 22 at the ends of the wings 14 can be switched off separately, which, however, is not relevant to the invention.

Figure 2:
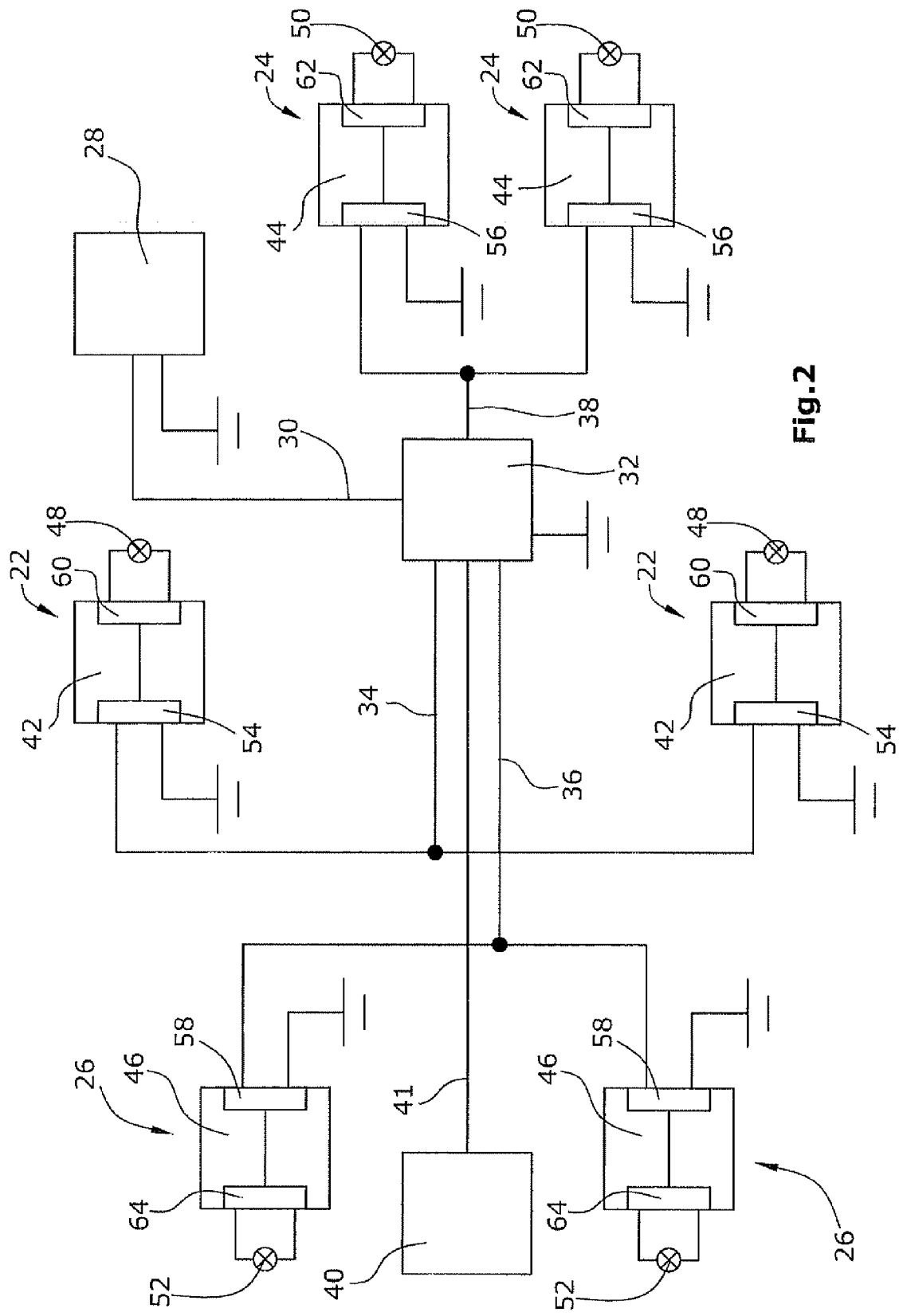

The individual navigation light units are supplied with the power required for their operation by a power supply unit 28, which is connected via a power supply line 30 to a central actuation unit 32 from which additional power supply lines 34, 36, 38 extend to the two navigation light units 22, the two navigation light units 26, and the two navigation light units 24. All the navigation light units are in turn connected via the outer shell, i.e., the metallic housing of the fuselage 10, as ground to the power supply unit 28. This power supply unit, which is used for the actuation of the navigation light units, is described in more detail in FIG. 2.

The central actuation 32 is operated from a control panel 40 which is located in the cockpit, is operated by the pilot or copilot, and is connected via a control line 41 to the central actuation unit 32. Via the control panel 40 the navigation light units can be operated in one of several modes of operation. Among these modes are, for example, the operation of the navigation light units with visible light (and in fact either dimmed or undimmed) and with infrared light (once again, either dimmed or undimmed) and as flashing light (visible light or infrared light). The coding of the operation mode predetermined from the cockpit is done in the central actuation unit 32 by short-term interruption of the power supply lines 34, 36 and 38, where the duration of the interruption corresponds to a binary code and thus is either a binary 1 or a binary 0. In this way the central actuation unit 32 therefore transmits data frames and in fact sequentially to the two navigation light units 22, the two navigation light units 24, and the two navigation light units 26. Each navigation light unit comprises a control unit 42, 44, 46 and, respectively downstream from this, a navigation light 48, 50, 52, with which, optionally, either visible light or infrared light can be emitted.

As has already been mentioned previously, the central actuation unit 32 actuates the individual pairs of navigation light units 22, 24, 26 sequentially, where the actuation sequence itself is once again transmitted repeatedly, even if the mode of operation is retained. This temporally delayed actuation of the individual pairs of navigation light units 22, 24, 26 would mean that the corresponding navigation lights 48, 50, 52 would also be switched on sequentially one after another. This is undesirable since all the navigation lights should be initiated and shine simultaneously. Thus it is provided in the concept according to the invention that the actuation of the individual navigation lights is done with a time delay in such a manner that only after the receipt of the actuation signal of the central actuation unit 32 by the last navigation light unit actuated in the sequence do all the navigation lights emit their radiation. For this purpose each control unit 42, 44, 46 comprises a time delay element 54, 56, 58. Since the sequence in which the individual navigation light units are actuated is fixed, each navigation light unit "knows" at what time in the actuation sequence it will be actuated. Thus, in each control unit a time delay can be stored (specifically in the time delay element allocated to the control unit) which is chosen so that all the navigation lights shine simultaneously despite sequential temporally offset actuation.

Through this temporally offset actuation of the individual navigation light units 22, 24, 26, in particular in the case of a power supply unit which is used to actuate the navigation lights and in which the outer shell of the aircraft 10 serves as ground, the result is obtained that the sensitivity to electromagnetic interference and the electromagnetic interference generated in given cases are clearly reduced, which permits the assumption that additional protective measures will be less complicated.

The coding of the modes of operation is done, as described previously, by short-term interruption of the power supply. Since, even during the operation of the navigation lights, this coding is always transmitted sequentially, it is necessary to secure the power supply of the navigation lights during the short-term interruption. Serving this purpose is an energy storage device 60, 62, 64 (for example, in the form of capacitors or the like) in the individual navigation lights 22, 24, 26.

What is claimed is:

1. Navigation lighting device for an aircraft, in particular a military aircraft and preferably a fighter aircraft, with
   several navigation light units (22, 24, 26) with navigation lights (48, 50, 52),
   a power supply unit (28) for the navigation light units (22, 24, 26), and
   a central actuation unit (32) for the actuation of the navigation light units (22, 24, 26) in each one of several modes of operation,
   wherein,
   the navigation light units (22, 24, 26) for operation in a mode of operation can be actuated by the actuation unit (32) sequentially in a predetermined sequence and thus with a time offset,
   each navigation light unit (22, 24, 26) comprises a control unit (42, 44, 46) connected to the actuation unit (32) for the actuation of its navigation light (48, 50, 52) in the operation mode predetermined by the central actuation unit (32),
   the control units (42, 44, 46) of the navigation light units (22, 24, 26) comprise time-delay elements (54, 56, 58) for the temporal delay of the actuation of the navigation lights (48, 50, 52) on the receipt of an actuation signal of the central actuation unit (32), and
   the time-delay elements (54, 56, 58) of the control units (42, 44, 46) of the navigation light units (22, 24, 26) are set in such a manner that the navigation lights (48, 50, 52) of all the navigation light units (22, 24, 26) can be actuated by their control units (42, 44, 46) despite a temporally offset receipt of the actuation signals of the central actuation unit (32).

2. Navigation lighting device according to claim 1, wherein the navigation light units (22, 24, 26) are subdivided into several groups, each of at least two navigation light units (22, 24, 26) and that the groups of navigation light units (22, 24, 26) can be actuated by the central actuation unit (32) sequentially in a predetermined sequence and thus temporally offset.

3. Navigation lighting device according to claim 1, wherein the time difference between the time delays set with the time-delay elements (54, 56, 58) of the control units (42, 44, 46) of each two navigation light units (22, 24, 26) is equal to the time offset between the times of the actuation of the control units (42, 44, 46) of the two navigation light units (22, 24, 26) in question by the central actuation unit (32).

4. Navigation lighting device according to claim 1, wherein the central actuation unit (32) sends the actuation signals to the navigation light unit (22, 24, 26) via power supply lines (30, 34, 36, 38) extending between the navigation light units and the power supply unit (28).

5. Navigation lighting device according to claim 4, wherein the actuation signals of the central actuation unit (32) include binary data for coding, where said binary data can be generated by short-term interruption of the power supply line (34, 36, 38) of a navigation light unit (22, 24, 26), where the duration of the interruption specifies the binary status, and that the navigation light units (22, 24, 26) comprise energy storage devices (60, 62, 64) for the supply of their navigation lights (48, 50, 52) during the interruption of the power supply.

6. Navigation lighting device according to claim 1, wherein the actuation of the control units (42, 44, 46) of the navigation light units (22, 24, 26) the central actuation unit (32) repeatedly sequentially actuates the navigation lighting units (22, 24, 26) during the entire period of operation of the navigation light units (22, 24, 26) in the same mode of operation.

7. Navigation lighting device according to claim 6, wherein the control unit (42, 44, 46) of a navigation light unit (22, 24, 26) does not recognize, for a time period which can be predetermined, a valid code in the actuation signals of the central actuation unit (32), the navigation light unit in question (22, 24, 26) operates from the control unit (42, 44, 46) in the operation mode corresponding to the code last recognized.

8. Navigation lighting device according to claim 1, wherein the power supply unit (28) is connected to each navigation light unit (22, 24, 26) via two electrical conductors (30, 34, 36, 38), where one of these conductors (30, 34, 36, 38) is formed for all the navigation light units (22, 24, 26) by a metallic housing of an aircraft.

9. Aircraft, in particular a military aircraft and preferably a fighter aircraft with
   a metallic housing (12, 14, 16, 18); and
   a navigation lighting device comprising several navigation light units (22, 24, 26) with navigation lights (48, 50, 52), a power supply unit (28) for the navigation light units (22, 24, 26), and a central actuation unit (32) for the actuation of the navigation light units (22, 24, 26) in each one of several modes of operation, wherein,
   the navigation light units (22, 24, 26) for operation in a mode of operation can be actuated by the actuation unit (32) sequentially in a predetermined sequence and thus with a time offset,
   each navigation light unit (22, 24, 26) comprises a control unit (42, 44, 46) connected to the actuation unit (32) for the actuation of its navigation light (48, 50, 52) in the operation mode predetermined by the central actuation unit (32),
   the control units (42, 44, 46) of the navigation light units (22, 24, 26) comprise time-delay elements (54, 56, 58) for the temporal delay of the actuation of the navigation lights (48, 50, 52) on the receipt of an actuation signal of the central actuation unit (32), and
   the time-delay elements (54, 56, 58) of the control units (42, 44, 46) of the navigation light units (22, 24, 26) are set in such a manner that the navigation lights (48, 50, 52) of all the navigation light units (22, 24, 26) can be actuated by their control units (42, 44, 46) despite a temporally offset receipt of the actuation signals of the central actuation unit (32) according to one of the foregoing claims, where the navigation light units (22, 24, 26) are disposed on the housing (12, 14, 16, 18).

10. Aircraft according to claim 9, wherein the navigation light units (22, 24, 26) are subdivided into several groups, each of at least two navigation light units (22, 24, 26) and that the groups of navigation light units (22, 24, 26) can be actuated by the central actuation unit (32) sequentially in a predetermined sequence and thus temporally offset.

11. Aircraft according to claim 9, wherein the time difference between the time delays set with the time-delay elements (54, 56, 58) of the control units (42, 44, 46) of each two navigation light units (22, 24, 26) is equal to the time offset between the times of the actuation of the control units (42, 44, 46) of the two navigation light units (22, 24, 26) in question by the central actuation unit (32).

12. Aircraft according to claim 9, wherein the central actuation unit (32) sends the actuation signals to the navigation light unit (22, 24, 26) via power supply lines (30, 34, 36, 38) extending between the navigation light units and the power supply unit (28).

13. Aircraft according to claim 12, wherein the actuation signals of the central actuation unit (32) include binary data for coding, where said binary data can be generated by short-term interruption of the power supply line (34, 36, 38) of a navigation light unit (22, 24, 26), where the duration of the interruption specifies the binary status, and that the navigation light units (22, 24, 26) comprise energy storage devices (60, 62, 64) for the supply of their navigation lights (48, 50, 52) during the interruption of the power supply.

14. Aircraft according to claim 9, wherein the actuation of the control units (42, 44, 46) of the navigation light units (22, 24, 26) the central actuation unit (32) repeatedly sequentially actuates the navigation lighting units (22, 24, 26) during the entire period of operation of the navigation light units (22, 24, 26) in the same mode of operation.

15. Aircraft according to claim 14, wherein the control unit (42, 44, 46) of a navigation light unit (22, 24, 26) does not recognize, for a time period which can be predetermined, a valid code in the actuation signals of the central actuation unit (32), the navigation light unit in question (22, 24, 26) operates from the control unit (42, 44, 46) in the operation mode corresponding to the code last recognized.

16. Aircraft according to claim 9, wherein the power supply unit (28) is connected to each navigation light unit (22, 24, 26) via two electrical conductors (30, 34, 36, 38), where one of these conductors (30, 34, 36, 38) is formed for all the navigation light units (22, 24, 26) by a metallic housing of an aircraft.

* * * * *